(12) United States Patent
Westgarde

(10) Patent No.: US 7,686,277 B2
(45) Date of Patent: Mar. 30, 2010

(54) TOOL SUPPORT APPARATUS

(76) Inventor: Wesley Wade Westgarde, 2612 Bold Road, Houston, B.C. (CA) V0J-1Z1

( * ) Notice: Subject to any disclaimer, the term of this patent is extended or adjusted under 35 U.S.C. 154(b) by 184 days.

(21) Appl. No.: 11/336,700

(22) Filed: Jan. 23, 2006

(65) Prior Publication Data

US 2006/0278773 A1    Dec. 14, 2006

Related U.S. Application Data

(60) Provisional application No. 60/685,393, filed on May 31, 2005.

(51) Int. Cl.
*A47G 29/00*    (2006.01)
*F16M 11/00*    (2006.01)

(52) U.S. Cl. .................. 248/688; 248/530; 248/533; 294/59; 254/131.5

(58) Field of Classification Search .............. 248/156, 248/545, 530, 533, 688; 43/21.2; 172/374, 172/375, 378; 294/51, 55.5, 59; 254/131.5; 56/400.04
See application file for complete search history.

(56) References Cited

U.S. PATENT DOCUMENTS

| | | | | |
|---|---|---|---|---|
| 994,005 A | * | 5/1911 | Jones | .......................... 248/88 |
| 1,508,206 A | * | 9/1924 | Waters | ........................ 248/682 |
| 1,752,400 A | * | 4/1930 | Sund | ............................ 15/246 |
| 3,783,547 A | * | 1/1974 | Bystrom et al. | .............. 43/21.2 |
| 5,009,027 A | * | 4/1991 | Lee | .............................. 43/21.2 |
| 5,039,052 A | * | 8/1991 | Carafice | ................... 248/309.1 |
| 5,161,772 A | | 11/1992 | DiResta et al. | |
| 5,878,563 A | | 3/1999 | Dutcher | |
| 6,951,095 B2 | | 10/2005 | Cusato | |
| 7,052,058 B2 | * | 5/2006 | Olinski | ........................ 294/59 |

FOREIGN PATENT DOCUMENTS

| CA | 2281068 A1 | * | 2/2000 |
|---|---|---|---|
| FR | 2765789 A1 | * | 1/1999 |

* cited by examiner

*Primary Examiner*—Gwendolyn Baxter
(74) *Attorney, Agent, or Firm*—Christensen O'Connor Johnson Kindness PLLC

(57) ABSTRACT

A tool support apparatus includes a body adapted to be secured to an end of a handle of a tool. A ground piercing member is pivotally secured to the body for pivotal movement between an operative position and a stored position. In the operative position, the ground piercing member protrudes past the end of the handle, such that the ground piercing member can be inserted into the ground to support the handle of the tool in a substantially upright orientation. In the stored position, the ground piercing member is oriented substantially parallel to the handle so as not to interfere with the normal usage of the tool.

11 Claims, 5 Drawing Sheets

TOOL SUPPORT APPARATUS

CROSS-REFRENCE TO RELATED APPLICATION(S)

This application claims priority from a U.S. Provisional Application, Ser. No. 60/685,393, entitled Garden tool attachment "spear-it", filed May 31, 2005.

FIELD OF THE INVENTION

The present invention relates to a tool support apparatus applicable to, construction, agriculture, gardening or yard tools, such as, a weeder, claw, rake, hoe, edging knife, pick, or cultivator.

BACKGROUND OF THE INVENTION

Existing handled tools that are used for the purpose of agricultural, gardening, or yard maintenance present a safety hazard when left laying down, or positioned horizontally on the ground, or site, because they may be stepped on, or driven on by support equipment (four wheelers, mowers, etc.). These chances increase if the area or site has tall grass or vegetation. Further, when these mentioned tools are left laying down, or positioned horizontally on a site or area surface they become difficult for the user, or other users to locate, or relocate, when desiring to utilize the tools, especially so if they are laying in tall grass or vegetation. When two or more tools are used in conjunction with each other, as could be the case of using a rake and shovel, usually the shovel is stuck in the ground when using the rake, however the rake is usually dropped to the ground making it slow and inconvenient to retrieve. Also tools that are left laying or positioned horizontally often collect soil, mud, or creatures such as slugs, and more so if the area or site is wet (rain or dew etc.), which may also decrease the working life of the tools. Sometimes tools that are left laying on the ground or in grassy areas cannot be located, or are lost.

Existing handled tools that are used for the purpose of construction and more particularly asphalt tools similarly have the same inconveniences for locating, quick retrieval, safety issues, as well the tool becomes covered with hot sticky asphalt when left laying down, or positioned horizontally on a site or area surface.

The patent literature discloses some potential solutions to this problem. U.S. Pat. No. 5,878,563 (Dutcher) shows a rake having a handle with a bend, and a support stand attached to a side of the head. U.S. Pat. No. 6,951,095 (Cusato) shows a rake having a telescoping handle with a pivoting head having a protruding fixed spike.

SUMMARY OF THE INVENTION

According to the present invention there is provided a tool support apparatus which includes a body with means for securing the body to an end of a handle of a tool. A ground piercing member is pivotally secured to the body for pivotal movement between an operative position and a stored position. In the operative position, the ground piercing member protrudes past the end of the handle, such that the ground piercing member can be inserted into the ground to support the handle of the tool in a substantially upright orientation. In the stored position, the ground piercing member is oriented substantially parallel to the handle so as not to interfere with the normal usage of the tool. Means are provided for locking the ground piercing member in a selected one of the pivotal positions.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
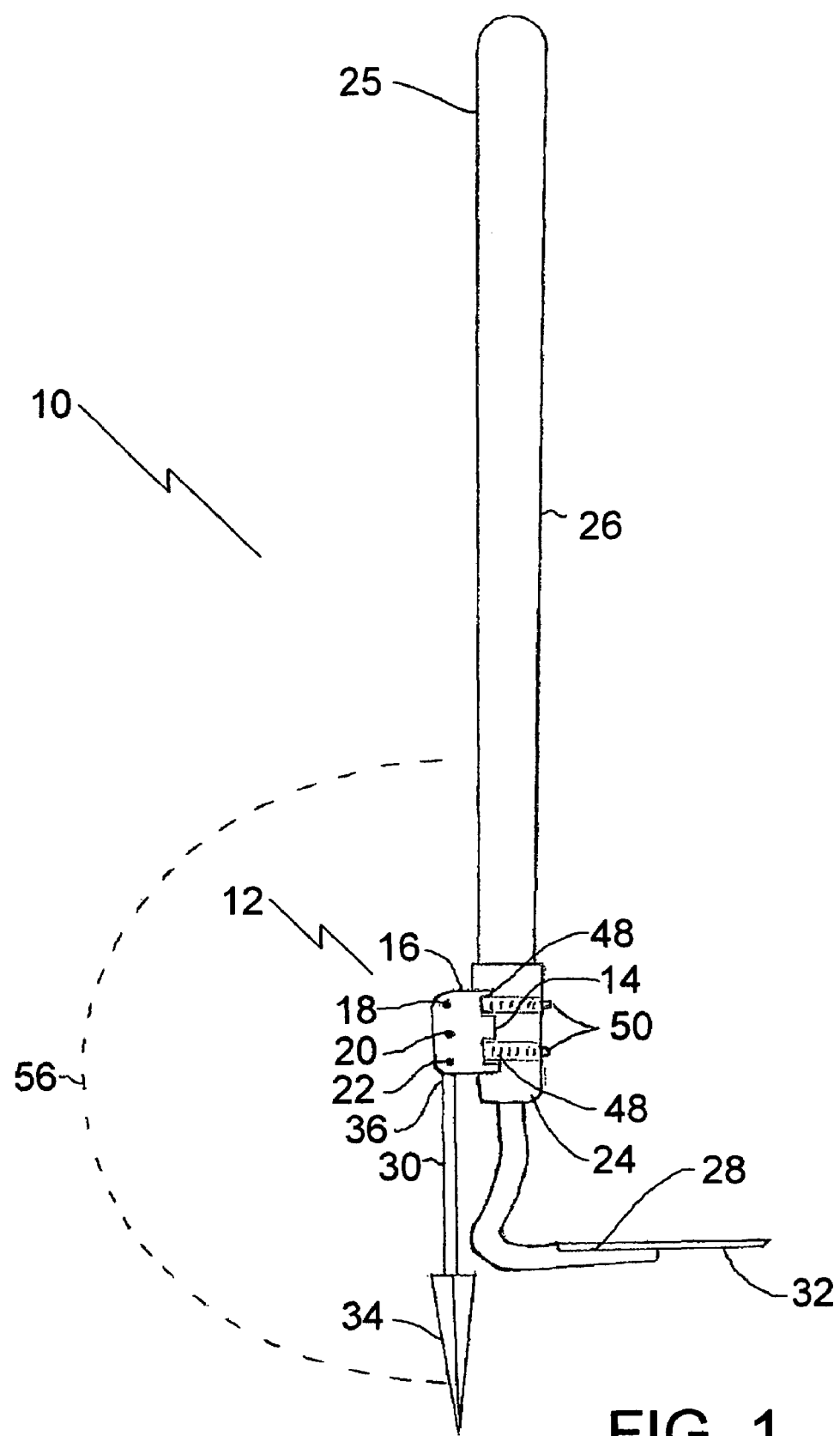
FIG. 1 is a side elevation view of a tool support apparatus constructed in accordance with the teachings of the present invention, attached with straps to a handle of a hoe, with the ground engaging member in an operative position.

The tool support apparatus generally identified by reference numeral 10, will now be described with reference to FIG. 1 through FIG. 5.

Structure and Relationship of Parts

Figure 2:
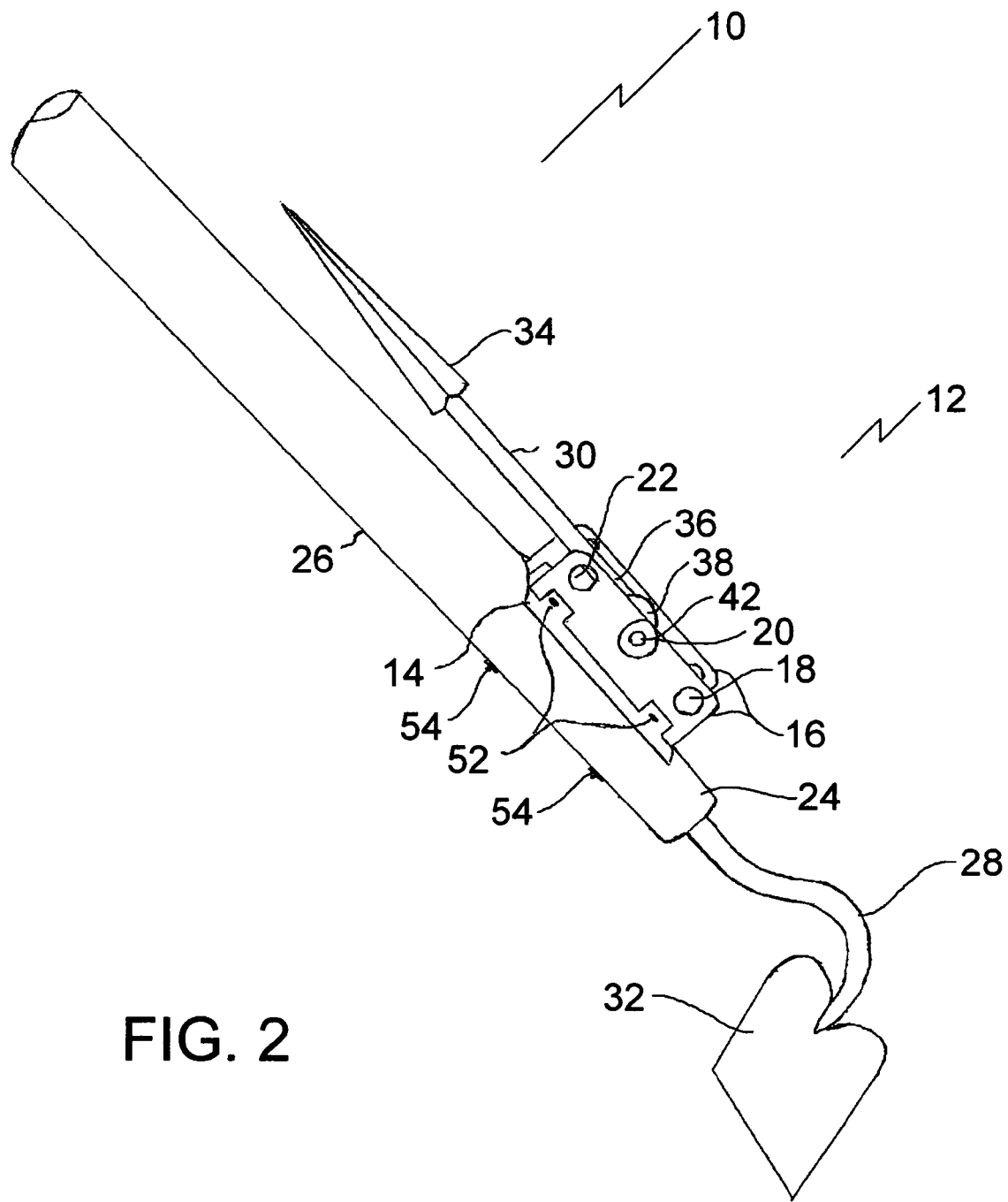
FIG. 2 is a perspective view of the tool support, attached with fasteners to a handle of a hoe, with ground engaging member in a stored position.
Figure 3:
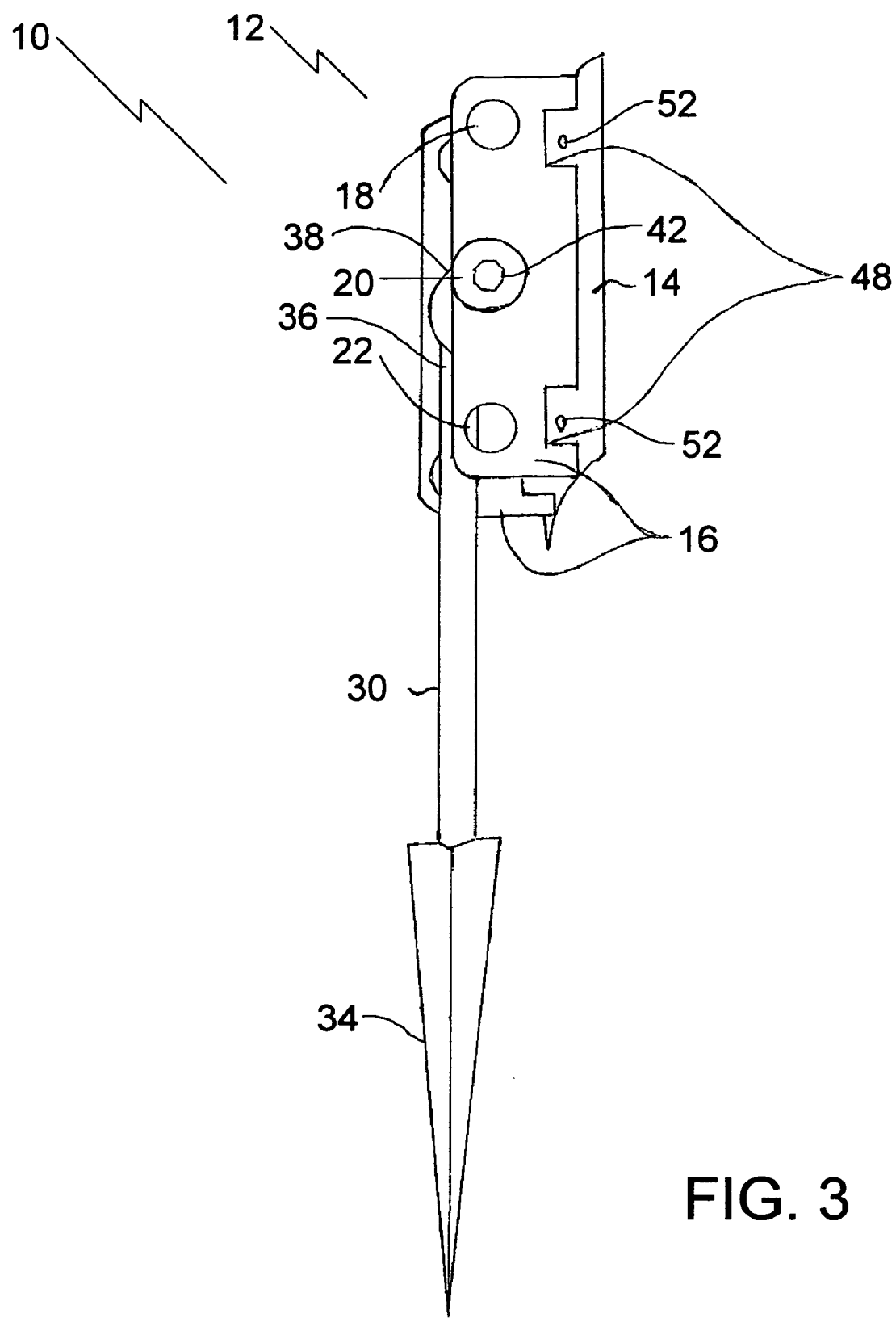
FIG. 3 is a perspective view of the tool support apparatus illustrated in FIG. 1 and FIG. 2.
Figure 4:
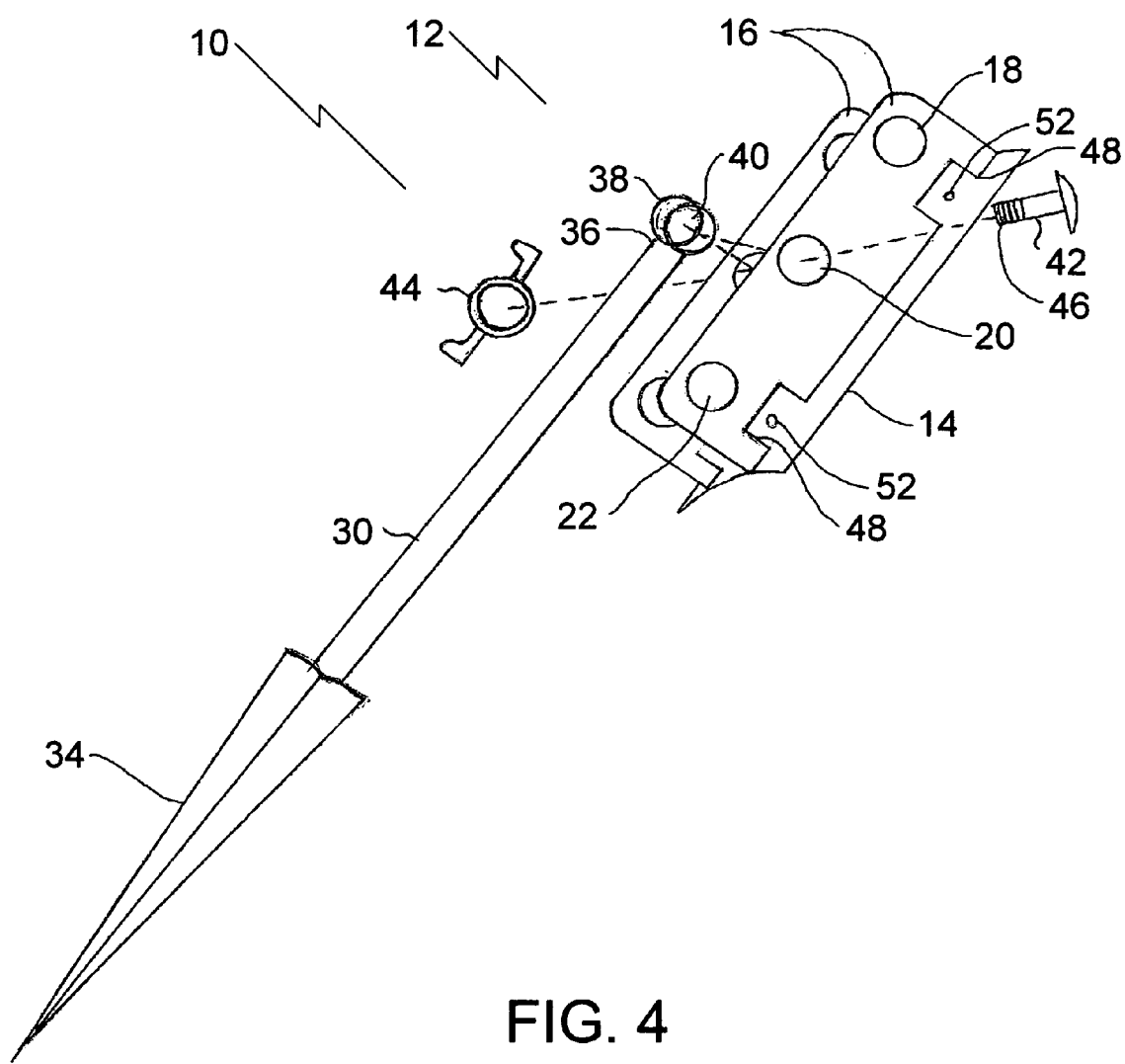
FIG. 4 is an exploded perspective view of the tool support apparatus illustrated in FIG. 3.

Referring to FIG. 3 and FIG. 4, tool support apparatus 10 has a body, generally indicated by reference numeral 12, which consists of a base 14 with two parallel walls 16. Parallel walls 16 have aligned pairs of holes 18, 20, 22. As will hereinafter be described, with reference to FIGS. 1, 2, and 5, body 12 is intended to be secured to an end 24 or 25 of a handle 26 of a tool 28, with attachment to end 24 being shown. There are various means for doing this, a few of which will be further described. Referring to FIG. 1 and FIG. 2, a ground piercing member 30 is pivotally secured to body 12 for pivotal movement between an operative position, illustrated in FIG. 1 and a stored position illustrated in FIG. 2. Referring to FIG. 1, in the operative position, ground piercing member 30 protrudes past end 24 or 25 of handle 26, such that ground piercing member 30 can be inserted into the ground to support handle 26 of tool 28 in a substantially upright orientation. It will be understood that, if a working member 32 is included on the same end of handle 26 as body 12, ground piercing member 30 will also protrude past working member 32. Referring to FIG. 2, in the stored position, ground piercing member 30 is oriented substantially parallel to handle 26 so as not to interfere with the normal usage of working member 32 of tool 28. Referring to FIG. 4, ground piercing member 30 has a piercing end 34 and an attachment end 36. Attachment end 36 has bushing 38 with a transverse opening 40. Ground piercing member 30 is pivotally mounted by positioning attachment end 36 between parallel walls 16 and extending a fastener 42 through aligned holes 20 in parallel walls 16 and transverse opening 40 in ground piercing member 30. A wing nut 44 is threaded onto an end 46 of fastener 42. The combination of parallel walls 16, fastener 42 and wing nut 44 serves as a means for locking ground piercing member 30 in a selected one of the pivotal positions (operative position or stored position). Wing nut 44 is threaded onto fastener 42 to exert a clamping force upon attachment end 36 of ground piercing member 30.

It should be noted that there are several pairs of aligned holes, identified as 18, 20, and 22. These pairs of holes 18, 20, and 22 provide body 12 with more than one mounting position for ground piercing member 30. This allows tool support apparatus 10 to accommodate installation requirements of varying tool configurations. If ground piercing member 30 needs to extend farther in the operative position or not so far in the stored position, the mounting provided by aligned holes 22 is used. If ground piercing member 30 needs to extend not as far in the operative position or farther in the stored position, the mounting provided by aligned holes 18 is used.

As mentioned above, it is envisaged that in most installations some form of clamping assembly will be used as means for securing the body to the end of the handle. Two clamping assemblies have been illustrated. Referring to FIG. 3 and FIG. 4, slotted strap guides 48 extend through parallel walls 16 adjacent to base 14 of body 12. Referring to FIG. 1, it can be seen how straps 50 or bands can be used to secure body 12 to end 24 or 25 of handle 26 of tool 28. Referring to FIG. 3 and FIG. 4, openings 52 are provided through base 14 of body 12. Referring to FIG. 2, it can be seen how fasteners 54 can be extended through openings 52 and used to secure body 12 to end 24 or 25 of handle 26 of tool 28. It will be appreciated that tool support apparatus 10 could be secured to handle 26 of tool 28 by welding, quick releases, and or other known methods too numerous to mention and illustrate.

Figure 5:
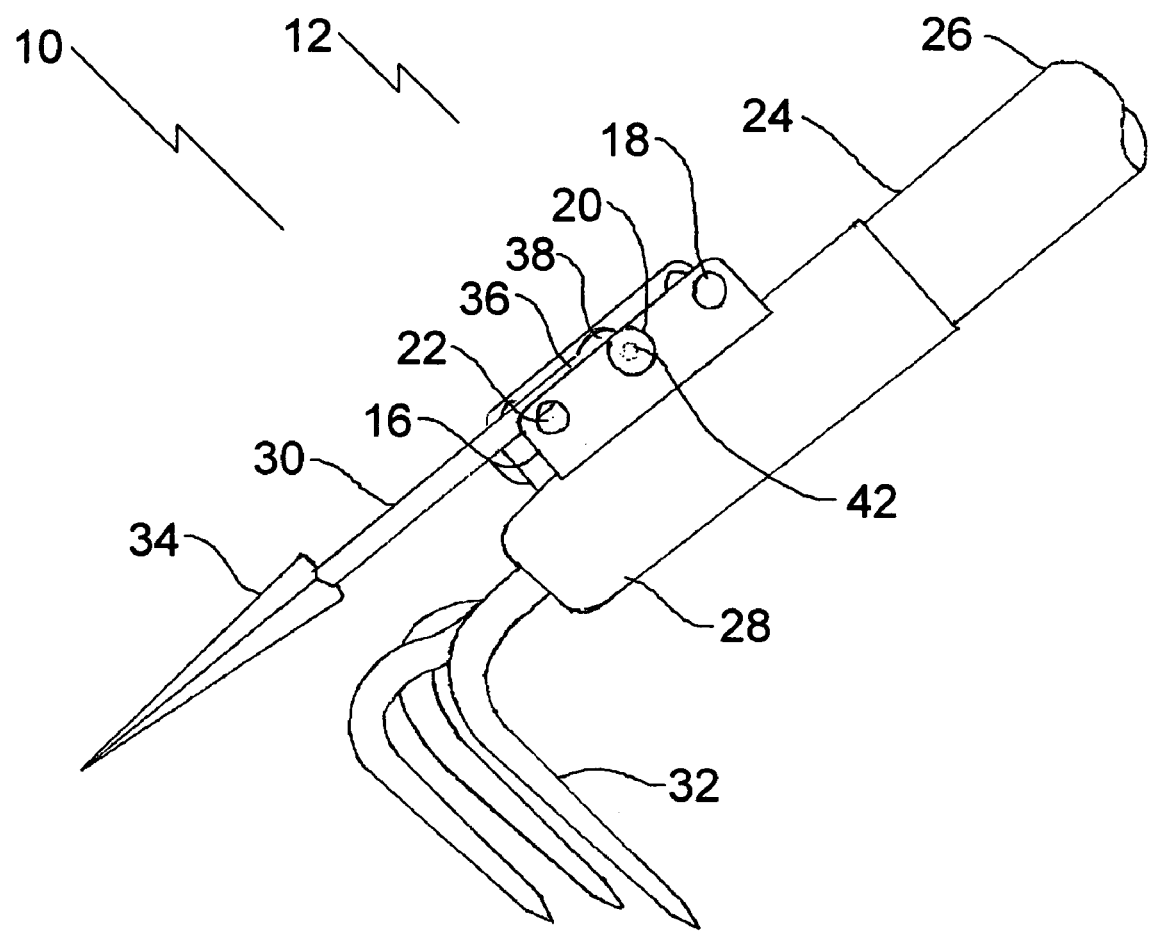
FIG. 5 is a perspective view of the tool support apparatus illustrated in FIG. 3, incorporated into a handle of a claw tool.

Once the teachings of the present invention are well known, original equipment manufacturers may start manufacturing handles with body 12 incorporated into their handle or working member 32 of their tool. Referring to FIG. 5, there is illustrated body 12 incorporated in tool 28.

Operation:

FIG. 1 shows a side view of tool support apparatus 10 attached to handle 26 of tool 28 (a hoe), using a clamping system, which uses metal bands or straps 50. These clamping bands 50 are commercially available. Ground piercing member 30 can be made or formed from metals, and or plastics, and or materials satisfactory for strength or other reasons. The depicted arc 56 demonstrates the swing travel of ground engaging member 30, between the operative position and the stored position. Ground engaging member 30 is shown in the operative position, with piercing end 34 extending beyond working member 32 of tool 28. In this operative position, piercing end 34 is in a position to penetrate a surface or object. Ground piercing member 30 can be positioned by the operator manually with hand and or foot and or by other methods as seen fit. It should be noted also that there could be various mechanisms arranged to activate the movement of the ground piercing member 30, for example a slide handle with connecting rods, spring activated devices, and or other mechanisms.

FIG. 2 shows a tool support apparatus 10 attached to handle 26 of tool 28 (hoe) using fasteners 54 (screws or bolts) passing through openings 52 in base 14 that may align with predrilled holes on or near working head 32 of tool 28. Ground piercing member 30 is shown in the stored position, withdrawn from working head 32 and parallel to handle 26 of tool 28, thereby permitted normal operation of tool 28.

FIGS. 3 and 4 show ground piercing member 30 pivoted on fastener 42. It will be appreciated that there are similar systems that could be used with pins, axles or bolts. It will also be appreciated that much different systems can be used which employ connections such as ball joints, universal joints, flexible material and or other suitable connections. Wing nut 44 is tightened to increase pressure exerted against ground piercing member 30 from parallel walls 16, to frictionally hold or lock ground piercing member 30 in a desired position. It is understood that other types of frictional holding or locking mechanisms could be used that include bump and detent, locking washers, spring loaded apparatuses, and or other systems as are know in the art.

FIG. 5, as previously described, shows a tool 28 into which has been incorporated tool support apparatus 10.

Advantages:

This invention provides a tool support apparatus that can be attached to, or be incorporated into a handle of a tool. This can be done at the gripping end, but for reasons of balance is preferably done near the working head of the tool. As described above, the tool support apparatus has a pivoting ground piercing member that swings or pivots between an operative position and a stored position and is maintained by friction in the selected position. In the operative position, the ground piercing member extends beyond the working head of the tool, allowing it to be speared into the ground. It can also be used for other purposes such as to spear litter and other objects. More importantly, in the stored position the ground piercing member is positioned parallel to the tool handle, and withdrawn from the working head of the tool, allowing the tool to be worked without compromising the designed methods of the tool. The present invention will give handled tools added versatility that will make tools handier saving money and time. Tools will be located and retrieved quicker, better preserved and safer, overcoming issues presented in the background. As an example most garden or agricultural tools have sharp edges or protrusions that if stepped on can cause injuries, but if the tools are standing upright there is less chance of stepping on them reducing related injuries. In another example the chances of driving on yard or agricultural tools with mowers or maintenance vehicles is reduced if they are standing upright which saves money and time because of flat tires and broken tools. Also when garden or agricultural tools are standing upright they are more visible which saves time and effort locating them especially if they are lying in tall grass or vegetation. Elderly people, or people with health restrictions will not have to bend over to pick up handled tools that are standing upright. Litter or objects can be easily pierced and retrieved with no bending over.

Although these embodiments are disclosed, still other design variations will become obvious to those understanding the detailed description. Further, the invention is capable of modifications while still functioning for the intended purpose, therefore the drawings are regarded as merely examples and not as limiting.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. In combination, a garden implement and a tool support apparatus, the garden implement comprising:

an elongate handle having a first end and a second end, the elongate handle having a longitudinal axis extending from the first end to the second end; and a tool head attached to the first end of the elongate handle; and the tool support apparatus comprising:
  a body;
    the body having means for securing the body to the elongate handle toward the first end of the elongate handle;
    a ground piercing member pivotally secured to the body by a pivot allowing substantially 180 degrees of pivotal movement between an operative position and a stored position, in the operative position the ground piercing member being oriented substantially parallel to the elongate handle and protruding past the tool head of the elongate handle such that the ground piercing member can be inserted into the ground to support the garden implement in a substantially upright orientation and in the stored position the ground piercing member being oriented substantially parallel to the elongate handle so as not to interfere with the normal usage of the tool head; and
  the body having means for locking the ground piercing member in a selected one of the pivotal positions,
  wherein the body has pairs of aligned attachment holes defining more than one mounting position spaced at intervals in a direction parallel to the longitudinal axis of the elongate handle for the ground piercing member, thereby accommodating installation requirements of varying tool head configurations.

2. The combination garden implement and tool support apparatus as defined in claim 1, wherein the body has an associated clamping assembly adapted for securing the body toward the first end of the elongate handle.

3. The combination garden implement and tool support apparatus as defined in claim 2, wherein the clamping assembly includes at least one strap guide in the body and the means for securing the body to the end of the handle is at least one strap.

4. The combination garden implement and tool support apparatus as defined in claim 2, wherein the clamping assembly includes openings extending through the body and the means for securing the body to the end of the handle is by means of fasteners that pass through the openings.

5. The combination garden implement and tool support apparatus as defined in claim 1, wherein the means for securing the body toward the first end of the elongate handle is to incorporate the body into one of the handle or the tool head.

6. The combination garden implement and tool support apparatus as defined in claim 1, wherein the ground piercing member has a piercing end and an attachment end, a clamp being positioned at the attachment end, and the means for locking the ground piercing member in a selected one of the pivotal positions being to use the clamp to exert a clamping force upon the attachment end of the ground piercing member.

7. The combination garden implement and tool support apparatus as defined in claim 6, the body having a base with two parallel walls, wherein the means for locking the ground piercing member in a selected one of the pivotal positions is a frictional engagement positioned between the parallel walls, which is adapted to engage the ground piercing member.

8. The combination garden implement and tool support apparatus as defined in claim 1, wherein the body has a base with two parallel walls, one of the attachment holes of each of the pairs of aligned attachment holes being positioned in each of the parallel walls.

9. The combination garden implement and tool support apparatus as defined in claim 8, wherein the ground piercing member has a piercing end and an attachment end, the attachment end having a transverse opening, and the parallel walls having aligned holes, the ground piercing member being pivotally mounted by positioning the attachment end of the ground piercing member between the parallel walls and extending a fastener through the aligned holes in the parallel walls and the transverse opening in the ground piercing member.

10. In combination, a garden implement and a tool support apparatus,
  the garden implement comprising:
    an elongate handle having a first end and a second end; and
    a tool head attached to the first end of the elongate handle; and
  the tool support apparatus comprising:
    a body having a base with two parallel walls, the parallel walls having aligned holes;
    the body having means for securing the body to the elongate handle toward the first end of the elongate handle;
    a ground piercing member pivotally secured to the body by a pivot allowing substantially 180 degrees of pivotal movement between an operative position and a stored position, in the operative position the ground piercing member being oriented substantially parallel to the elongate handle and protruding past the tool head of the elongate handle such that the ground piercing member can be inserted into the ground to support the garden implement in a substantially upright orientation and in the stored position the ground piercing member being oriented substantially parallel to the elongate handle so as not to interfere with the normal usage of the tool head,
    the ground piercing member having a piercing end and an attachment end, the attachment end having a transverse opening, the ground piercing member being pivotally mounted by positioning the attachment end of the ground piercing member between the parallel walls and extending a fastener through the aligned holes in the parallel walls and the transverse opening in the ground piercing member; and
    a nut at an end of the fastener for locking the ground piercing member in a selected one of the pivotal positions by tightening the nut to exert a clamping force upon the attachment end of the ground piercing member,
    wherein the body has pairs of aligned attachment holes defining more than one mounting position spaced at intervals in a direction parallel to the longitudinal axis of the elongate handle for the ground piercing member, thereby accommodating installation requirements of varying tool head configurations.

11. In combination, a garden implement and a tool support apparatus,
  the garden implement comprising:
    an elongate handle having a first end and a second end, the elongate handle having a longitudinal axis extending from the first end to the second end; and
    a tool head attached to the first end of the elongate handle; and
  the tool support apparatus comprising:
    a body;
    an assembly configured to secure the body to the elongate handle toward the first end of the elongate handle;
    a ground piercing member pivotally mounted to the body by a pivot allowing substantially 180 degrees of pivotal movement between pivotal positions including an operative position and a stored position, wherein in the operative position the ground piercing member is oriented substantially parallel to the elongate handle and protrudes past the tool head of the elongate handle such that the ground piercing member can be inserted into the ground to support the garden implement, and in the stored position the ground piercing member is oriented substantially parallel to the elongate handle so as not to interfere with the normal usage of the tool head; and a pivotal locking mechanism configured to lock the ground piercing member in a selected one of the pivotal positions, wherein the body of the tool support apparatus includes pairs of aligned attachment holes that are spaced at intervals in a direction parallel to the longitudinal axis of the elongate handle and define more than one mounting position for the ground piercing member.

* * * * *